United States Patent Office 3,529,036
Patented Sept. 15, 1970

3,529,036
LIQUID BUTADIENE POLYMER HAVING TERMINAL ALLYLIC HALIDE GROUPS AND A LIQUID EPOXY RESIN
Douglas C. Edwards, Sarnia, Ontario, Canada, assignor to Polymer Corporation Limited, a body corporate
No Drawing. Filed Feb. 17, 1967, Ser. No. 616,777
Claims priority, application Canada, Mar. 12, 1966, 954,555
Int. Cl. C08g 41/04
U.S. Cl. 260—836                          7 Claims

ABSTRACT OF THE DISCLOSURE

A novel composition suitable for use in sealants is prepared by vulcanizing a mixture of a liquid butadiene polymer having allylic halide groups and a liquid epoxy resin with an amine, preferably an aliphatic amine containing at least four nitrogen atoms.

---

This invention relates to terminally-active liquid polymers of diolefinic hydrocarbon monomers and particularly to vulcanizates of these polymers.

In this specification, "liquid" polymers are defined broadly as polymers having intrinsic viscosities in toluene at 30° C. of about 0.04–1.0, and "vulcanizates" are the reaction products of the liquid polymer with compounds having a functionality of two or more and which are capable of joining together molecules of the liquid polymer.

Terminally-active polymers have previously been prepared by processes such as (a) condensation reactions of monomers containing the active end groups to produce alpha-omega di-functional polymer molecules, (b) anionic polymerization of unsaturated monomers with organo-alkali metal initiators such as organo-lithium compounds to form polymers containing terminal alkali metal atoms, then replacing the alkali metal atoms with reactive groups, and (c) degrading a preformed polymer in solution under conditions which provide the ends of the polymer fragments at the points of chain scission with chemically reactive groups. While these products and processes have been employed with varying degrees of success as bases for sealants, caulking compounds, rocket fuel binders, etc., alternate and simpler products and processes are deemed to be desirable to produce products having improved properties and to reduce the cost problems variously characteristic of the prior processes. The novel vulcanizates of the present invention are relatively inexpensive, can be prepared at room temperature and have good adhesion to glass, metals and wood.

The composition of the present invention is a mixture comprised of (a) an aqueous emulsion polymerized undegraded olefinically unsaturated unvulcanized liquid polymer composition containing molecules comprising a polymerized $C_4$–$C_8$ diolefinic hydrocarbon compound, a major proportion of said molecules being characterized by the presence of two separated

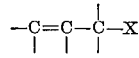

structures within their molecular structures, where X is a halogen atom selected from bromine, chlorine and iodine, said liquid polymer composition being characterized by an intrinsic viscosity within the range of 0.04–1.0 when measured in toluene at 30° C. and (b) an epoxy resin.

The liquid polymer compositions may be prepared by a process comprising causing a monomer system comprising a $C_4$–$C_8$ diolefinic hydrocarbon compound to polymerize under aqueous emulsion polymerization conditions in the presence of at least about 0.15 mole per 100 moles of monomer, of a compound of the type X(Y)Z where X is Br, I or Cl; Z is —$CBr_3$, —$CCl_3$, —$CI_3$ or >$CI_2$; Y is a radical having a structure selected from the group consisting of

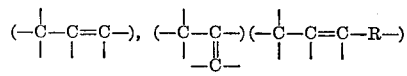

and

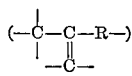

where R is a hydrocarbon or substituted hydrocarbon radical having a molecular weight of from 14 up to about 1000, to obtain a latex of said polymer and recovering the polymer from said latex.

The liquid polymer compositions are substances ranging in consistency from pourable liquids to highly viscous or Vaseline-like materials at room temperature. They have intrinsic viscosities as measured in toluene at 30° C. ranging from 0.04 to 1.0 and preferably from 0.05 to 0.6. Although the ideal polymer compositions are characterized by the presence of an allylic halogen atom at or near each end of every polymer molecule, large scale commercial practice may make the ideal impractical of attainment since not all molecules may be so characterized. It has been found that excellent properties may be obtained with compositions wherein only a major proportion of the molecules are thus characterized with the remaining molecules being monofunctional, i.e. having only one terminal group containing an allylic halogen atom and including the possible presence of a minor proportion which may be halogen-free in the terminal groupings.

The presence of the allylic halogen atoms at or near the terminal carbon atoms of the polymer chains imparts a considerable degree of vulcanization activity to the polymers when contacted with multi-functional compounds having a functionality of two or more such as multi-functional amines which are capable of reacting with the halogen atoms to cause a linking of the polymer molecules and thus convert the liquid polymers into elastomeric end products. Broadly, the halogen content of the unvulcanized polymers will fall within the range of 1 to 15 weight percent of the total weight of the polymer composition and preferably within the range of 1.5 to 10 weight percent.

Depending on the molecular weight of the raw polymer and the manner in which it has been compounded, the compositions may be subject to cold flow on standing prior to vulcanization. In some applications, this characteristic of cold flow may be undesirable and may be overcome by the additional incorporation of 5–20 parts by weight of materials which impart thixotropic properties to the polymer compositions. Materials such as polyethylene, polypropylene and trans-polyisoprene have been found to be suitable. For example, about 10 parts of polyethylene per 100 parts by weight of a polymer having an intrinsic viscosity of about 0.4 effectively eliminates cold flow with the composition still retaining its softness and easy-working character. These materials may be incorporated directly in the liquid polymer or by adding as a solution in or mixture with a solvent such as an oil which is compatible with the liquid polymer.

As specified earlier, a portion of the liquid polymer's molecular structure is comprised of a polymerized $C_4$–$C_8$ dienic hydrocarbon compound. Preferably the polymerized diene forms a major proportion of the polymer. More than one dienic hydrocarbon compound may be employed to form the dienic portion of the liquid polymers, and when the polymer is a copolymer of a diolefin and a mono-olefin, more than one mono-olefinic monomer may be used to form the non-dienic portion of the polymer. The $C_4$–$C_8$ dienes which may be employed include conjugated dienes such as butadiene-1,3; 2-methyl butadiene-1,3; pentadiene-1,3; hexadiene-1,3; 2,3-hexadiene-1,3; 2-chloro-butadiene-1,3 and 2,3 dimethyl butadiene-1,3 with butadiene-1,3 being preferred. The mono-olefinic monomers include compounds such as styrene, acrylonitrile and methyl methacrylate. Of the various liquid homo-polymers and copolymers which may be prepared by the process of this invention, those containing a major proportion of polymerized butadiene-1,3 are preferred.

In preparing the halogen-containing liquid polymers, the polymerizable monomer system is emulsified in water and caused to polymerize in the presence of a compound of the type $X(Y)Z$ where X is Br, I or Cl; Z is —$CBr_3$, —$CCl_3$, —$CI_3$ or >$CI_2$; Y is a radical having a structure selected from the group consisting of

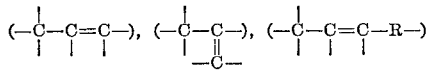

and

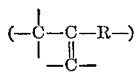

where R is a hydrocarbon or substituted hydrocarbon radical having a molecular weight of from 14 up to about 1000. While the $X(Y)Z$ type compound is thermally decomposable to form free-radicals capable of initiating the polymerization of the monomers, the polymerization is preferably initiated by the decomposition of free-radical forming compounds of the conventional type employed in aqueous emulsion polymerizations such as the peroxygen initiators. The amount of the $X(Y)Z$ type compound required to be used will vary depending on the type of compound employed and the viscosity desired in the halogen-containing liquid polymer which is to be prepared. The amount should be at least 0.15 mole of compound per 100 moles of monomer. While more may be used, the amount generally will not exceed about 6.5 moles per 100 moles of monomer. As indicated earlier, the type of compound, i.e. the degree of its activity, will be a determining factor regarding the amount employed since not all compounds are equally active. For example, when the $X(Y)Z$ halogen compound is of the type $Br_3$ C-(polybutadiene-1,3 radical)-Br where the polybutadiene-1,3 radical is 2–10 butadiene units long with the butadiene being polymerized through the 1 and 4 carbon atoms, at least 0.5 mole should be employed and preferably 0.8–6.5 moles when the monomer system to be polymerized consists of butadiene-1,3 only. When the compound is of the type $I_2H$ C-(polybutadiene-1,3 radical)-I where the radical and the monomer system are each as described for the preceding example, at least 0.15 mole of compound should be used and preferably 0.25–2.0 moles since this compound is more active. The foregoing compounds will result in the production of excellent liquid polymers. The required proportion for each combination of halogen compound and polymerizable monomer system can be easily determined by simple preliminary testing.

When employing anionic emulsifiers for the polymerization reaction, it may be desirable to include a buffering compound to maintain the pH of the system alkaline. If desired, there may also be present a small amount of a $C_{12}$–$C_{16}$ mercaptan. Examples of suitable conventional polymerization initiators are cumene hydroperoxide, diisopropylbenzene hydroperoxide, azo-bis-isobutyronitrile, potassium persulfate and sodium persulfate and the amount used may vary widely, e.g. 0.1–5.0% by weight of the monomers. The presence of the $X(Y)Z$ type compound is essential during the polymerization reaction for the formation of the halogen-containing liquid polymers of the present invention.

The polymerization reaction may be carried out broadly speaking at any temperature from about 5° C. to about 80° C. or higher. Product properties such as tensile strength and sol-gel behaviour of the vulcanizates are improved progressively with increase in the conversion to which the monomer polymerization is taken. They appear to be best at 100% conversion when butadiene-1,3 is the sole monomer.

After the polymerization reaction has been completed, the halogen-containing liquid polymer is recovered by coagulation from the latex in which it is obtained. The usual method of recovering solid rubbery polymers from their latexes is to first subject the latex to a stripping step to remove unreacted monomers, then to coagulate the polymers by mixing the latex with an aqueous solution of an ionizable salt and/or acid and finally to filter off, water-wash and dry the coagulated polymer. This procedure is not very satisfactory for the liquid polymers in the present case since it does not provide for the removal of low molecular weight monofunctional molecules which are also usually formed and which interfere with subsequent curing operations to which the liquid polymers are subjected. Thus the full potential of the properties of the liquid polymers cannot be realized. It has been found that if prior to drying, the coagulated liquid polymer is given a wash with a material such as acetone or a low molecular weight alcohol such as ethanol in which the low molecular weight monofunctional cure-interfering fraction is soluble but in which the difunctional higher molecular weight liquid polymer is insoluble, a very satisfactory product is obtained. Another satisfactory but more expensive method of purification is to subject the polymer to one or more acetone or alcohol precipitations from solution in a solvent such as benzene or toluene.

The epoxy resins of this invention may vary widely in viscosity, composition and epoxy content. Solid epoxy resins may be used but liquid epoxy resins are preferred, particularly those having a viscosity of about 1–500 poises or higher at 25° C., as measured with a rotating cylinder or spindle viscometer such as the Brookfield viscometer. The optimum viscosity of the liquid epoxy resin will be dependent on the viscosity desired in the final formulation. The diglycidyl ether derivatives of bis(4-hydroxyphenyl)dimethyl methane, and its homologues, are the preferred form of epoxy resin but other types such as glycidyl ethers of glycerol, glycidyl ethers of bis (4-hydroxyphenyl) methane, glycidyl ethers of tetrakis (hydroxyphenyl) ethane and epoxylated novalacs may be used. The epoxide content may vary between about 0.0015–0.0075 gram chemical equivalent of epoxide per gram of resin, but a content of between 0.002–0.006 gram chemical equivalent of epoxide per gram of resin is preferred. The composition may contain between 1–100 parts by weight of epoxy resin per 100 parts by weight of liquid polymer, a preferred range being between 15 and 40 parts by weight of resin. The actual amount of epoxy resin used in the composition of this invention is limited by the necessity of the vulcanized composition being rubbery in character and by the degree of adhesion required.

The liquid polymers of the present invention can be readily "cold" cured, that is, vulcanized, into said rubbery products at ambient temperatures, usually 15–35° C., with multifunctional compounds which are capable of reacting with the allylic halogen atoms. With multifunctional amines, which are the preferred curing agents, cure can be effected in times as short as a few minutes or as long as a few hours or even days, depending on the activity of the amine and the polymer, the temperature level, the amount and type of amine employed, etc. The amount of amine used will normally be in the range of about 0.5–15 weight percent per 100 parts of polymer and preferably in the range of about 1–10 weight percent. Suitable amines include hexamethylene diamine, methylated hexamethylene diamine, diethylene triamine, methylated diethylene triamine, triethylene tetramine, methylated triethylene tetramine, tetraethylene pentamine, N-amino-ethyl piperazine, etc. The polyfunctional amines are preferably aliphatic polyamines and more preferably liquid aliphatic amines with low vapour pressure and odour and which are easy to handle. Curing agents having a functionality of four or more are particularly suitable since they can tie up a moderate amount of cure-interfering monofunctional polymer chains and still allow for chain extension of the difunctional polymer to obtain good tensile strength. Gum tensile strengths as high as 250 p.s.i. or more may be obtained and when fillers are also included and thoroughly mixed into the liquid polymer, vulcanizates having tensile strengths of over 900 p.s.i. are obtainable. Examples of fillers which may be employed are carbon blacks, powdered metals, silicas, clays, etc. Low structure high abrasion furnace blacks give particularly good results.

The following examples will further illustrate the invention. In these examples, all parts are parts by weight unless specified otherwise.

EXAMPLE I 100 parts of butadiene and 15 parts of tetrabromomethane were emulsified in 200 parts of water containing 5 parts of dissolved sodium alkyl aryl sulfonate and 5 parts of dissolved tri-potassium phosphate buffer. After raising the temperature of the system to 60° C., 0.75 part of potassium persulfate was added. A second increment of potassium persulfate, 0.25 part, was added to the agitated emulsion after 60 hours. After 75 hours, 75% of the butadiene was converted to polymer in the form of an aqueous latex. The polymer was recovered by coagulation with methanol, then purified by dissolving in benzene and precipitating with acetone followed by drying under vacuum at 50° C. 1.25 parts of methylene-bis (2-nonyl-4-methyl) phenol antioxidant were added prior to the vacuum drying step. The dried polymer was a water-white viscous liquid having an intrinsic viscosity in toluene at 30° C. of 0.29 and a combined bromine content of 3.45 weight percent.

0–20 parts of a liquid epoxy resin "A," having a viscosity of 130 poises at 25° C. and containing about 0.005 gram chemical equivalent of epoxide per gram of resin, were thoroughly mixed into 100 parts of the above prepared liquid polymer. 2.5 parts of the vulcanizing agent, N,N,N',N'',N''',N''', hexamethyl triethylene tetramine, were added to 100 parts of the liquid polymer and resin mixture.

The compositions were tested for adhesion to glass, steel, aluminum and plywood panels. The 3" x 4" test panel was partially covered by a plastic polytetrafluoroethylene sheet and a rectangular opening 1" x 2.5" of a steel template was placed over both the plastic sheet and the uncovered portion of the test panel. The adhesive compound was inserted in the template cavity by spreading with a knife. The compound was allowed to cure for 7 days at 25° C. after which the template and plastic sheet were removed. The adhesive was bonded to the formerly uncovered portion of the test panel, there being no adhesion between the compound and the previously covered portion of the test panel.

Tensile, elongation and modulus measurements were performed on samples removed from the unbonded portion of the adhesive compound strips. Adhesion was then measured by inserting the test panel and the non-bonded end of the compound in opposite pairs of jaws of a tensile test instrument, and measuring the resistance when the jaws were separated at a rate of 10 inches per minute. Adhesion was also estimated after immersion of other test specimens in water at 25° C. for 24 hours by pulling apart by hand. The physical properties of the adhesive compositions are presented in Table I.

TABLE I

| Property | Sample | | | | |
|---|---|---|---|---|---|
| | 1 | 2 | 3 | 4 | 5 |
| Epoxy resin "A" loading (parts) | 0 | 5 | 10 | 15 | 20 |
| Tensile strength, (p.s.i.) | 220 | 225 | 230 | 215 | 195 |
| Elongation, (percent) | 570 | 510 | 700 | 800 | 870 |
| 100% modulus | 95 | 95 | 65 | 65 | 60 |
| Adhesion (lbs./inch): | | | | | |
| To glass | 0.3 | 2.0 | 3.6 | A | A |
| To steel | 2.0 | 3.8 | A | A | A |
| To aluminum | 0.7 | 4.0 | A | A | A |
| To varnished plywood | 3.5 | A | A | A | A |
| Adhesion after 24 hrs. immersion in water: | | | | | |
| To glass | D | C | C | A | A |
| To steel | D | C | C | B | A |
| To aluminum | D | C | C | B | A |

The letters A–D inclusive are used as abbreviations in this and other examples to indicate the type of adhesion obtained; A indicates a very good bond, cohesive failure occurring; B indicates a good bond, adhesive failure occurring; C indicates a weak bond, adhesive failure occurring; D indicates separation of the test panel and adhesive during immersion in water. Where very good bonds were obtained (A), which resulted in cohesive rather than adhesive failure, numerical results are not reported since they would indicate only the breaking strength of the strip, which is not a useful or meaningful quantity.

The above results indicate that the adhesion of the liquid polymer to glass, steel, aluminum and plywood increases with increasing amounts of epoxy resin "A" being present in the adhesive composition.

EXAMPLE II

The procedure of Example I was repeated, except that liquid epoxy resin "B," having a viscosity of 8 poises at 25° C. and containing about 0.005 gram chemical equivalent of epoxide per gram of resin, was used in place of resin "A."

The results are presented in Table II.

TABLE II

| Property | Sample | | | |
|---|---|---|---|---|
| | 1 | 2 | 3 | 4 |
| Epoxy resin "B" loanding, (parts) | 5 | 10 | 15 | 20 |
| Tensile strength, (p.s.i.) | 215 | 240 | 195 | 115 |
| Elongation, (percent) | 480 | 750 | 910 | 880 |
| 100% Modulus (p.s.i.) | 100 | 70 | 55 | 40 |
| Adhesion (lbs./inch): | | | | |
| To glass | 3.3 | 4.3 | A | A |
| To steel | 3.6 | A | A | A |
| To aluminum | 3.9 | A | A | A |
| To varnished plywood | A | A | A | A |
| Adhesion after 24 hrs. immersion in water: | | | | |
| To glass | C | C | B | B |
| To steel | C | C | B | A |
| To aluminum | C | C | B | B |

These results indicate that an increase in the amount of epoxy resin "B" added to the liquid polymer increases adhesion to glass, steel and aluminum.

EXAMPLE III

Two compounds were prepared from the liquid polymer of Example I. 30 parts of low structure, high abrasion furnace black and 10 parts of liquid epoxy resin "B" were thoroughly blended into 100 parts of liquid polymer on a 3 roll paint mill, followed by 3.0 parts of the vulcanizing agent, N,N,N',N'',N''',N''', hexamethyl triethylene tetramine. Sample 2 was similar except that the epoxy resin was omitted and 2.5 parts of the vulcanizing agent were used. The compounds were allowed to cure for 7 days at 25° C. when the properties detailed below were obtained.

TABLE III

| Property | Sample 1 | Sample 2 |
|---|---|---|
| Epoxy resin "B" loading (parts) | 10 | 0 |
| Tensile strength (p.s.i.) | 660 | 900 |
| Elongation (percent) | 660 | 950 |
| 100% modulus (p.s.i.) | 150 | 150 |
| Adhesion (lbs./inch): | | |
|    To glass | 7.0 | 0.8 |
|    To steel | 12.5 | 3.4 |
|    To aluminum | 9.4 | 1.2 |
|    To unvarnished plywood | 14.8 | 0.9 |
| Adhesion after 24 hours immersion in water: | | |
|    To glass | C | D |
|    To steel | B | D |
|    To aluminum | C | D |
|    To unvarnished plywood | C | D |

These results indicate that the presence of 10 parts of epoxy resin "B" in a mixture comprising liquid polymer and carbon black results in a composition useful for example as a sealant in automobiles for bonding windshields to metal surfaces.

EXAMPLE IV

A series of compounds was prepared in which 30 parts of low structure high abrasion furnace black, 15 parts of liquid epoxy resin "A," "B" or "C" and 2.5, 3.0 or 3.5 parts of vulcanizing agent, N,N,N',N'',N''',N''', hexamethyl triethylene tetramine, were added to 100 parts of the liquid polymer of Example I. Epoxy resin "C" had a viscosity of 450 poises at 25° C. and contained about 0.002 gram chemical equivalent of epoxide per gram of resin.

Tensile, elongation and modulus measurements were made after 7 days cure at room temperature. Adhesion measurements were made after 21 days at room temperature.

TABLE IV

| Property | Sample | | | | | | | | |
|---|---|---|---|---|---|---|---|---|---|
| | 1 | 2 | 3 | 4 | 5 | 6 | 7 | 8 | 9 |
| Epoxy resin "A" loading (parts) | 15 | 15 | 15 | | | | | | |
| Epoxy resin "B" loading (parts) | | | | 15 | 15 | 15 | | | |
| Epoxy resin "C" loading (parts) | | | | | | | 15 | 15 | 15 |
| Vulcanizing agent loading (parts) | 2.5 | 3.0 | 3.5 | 2.5 | 3.0 | 3.5 | 2.5 | 3.0 | 3.5 |
| Tensile strength (p.s.i.) | 405 | 355 | 350 | 275 | 225 | 295 | 525 | 605 | 675 |
| Elongation (percent) | 710 | 590 | 640 | 590 | 470 | 400 | 560 | 535 | 490 |
| 100% modulus (p.s.i.) | 140 | 170 | 150 | 100 | 145 | 180 | 190 | 235 | 255 |
| 300% modulus (p.s.i.) | 230 | 255 | 240 | 130 | 210 | 270 | 340 | 425 | 485 |
| Adhesion to glass (lb./inch) | A | A | A | 8.2 | A | 8.8 | A | A | A |
| Adhesion after 24 hours immersion in water | A | A | A | A-B | A | C | B | B-C | B |

These results indicate that the above adhesive compositions would be useful as sealants in the automotive industry and in the construction industry for sealing curtain wall windows, that is doubled glazed windows, and panels. Other applications of the adhesive composition of this invention, in addition to those described in the examples, are as a sealing gasket for highway expansion joints, as a caulking compound for joints, curtain wall windows and panels and as a rocket fuel binder.

What is claimed is:

1. A composition comprising a mixture of (a) 100 parts by weight of an aqueous emulsion polymerized undegraded olefinically unsaturated unvulcanized liquid polymer of a $C_4$–$C_8$ diolefinic hydrocarbon compound, a major proportion of molecules of said polymer being characterized by the presence of two separated and terminally located allylic bromide groups within their molecular structures, said liquid polymer composition being characterized by an intrinsic viscosity within the range of 0.04–1.0 when measured in toluene at 30° C. and (b) from 1 to 100 parts by weight of an epoxy resin having more than one epoxy group per molecule and containing about 0.0015 to 0.0075 gram chemical equivalent of epoxide per gram of resin.

2. The composition of claim 1 in which said polymer molecules comprise a polymerized butadiene-1,3.

3. The composition of claim 2 in which the epoxy resin is a liquid epoxy resin having a viscosity of about 1–500 poises at 25° C. and containing about 0.002–0.006 gram chemical equivalent of epoxide per gram of resin.

4. The composition of claim 1 whenever vulcanized with an amine.

5. The composition of claim 4 in which the amine is an aliphatic amine.

6. The composition of claim 4 in which per 100 parts by weight of the liquid polymer there is about 15 to 40 parts by weight of the epoxy resin and about 0.5–15.0 parts by weight of the amine.

7. The composition of claim 6 in which the amine is N,N,N',N'',N''',N''' hexamethyl triethylene tetramine.

References Cited

UNITED STATES PATENTS

| 1,898,522 | 2/1933 | Bock | 260—82.1 |
| 2,401,099 | 5/1946 | Peterson | 260—654 |
| 2,463,225 | 3/1949 | Vincent | 260—82.1 |
| 2,518,573 | 8/1950 | Scott | 260—94.2 |

FOREIGN PATENTS 524,051  4/1956  Canada.

SAMUEL H. BLECH, Primary Examiner

P. LIEBERMAN, Assistant Examiner

U.S. Cl. X.R.

117—124, 132, 148; 260—2, 29.7, 37, 41.5, 45.95, 47, 82.1, 94.2, 837, 889, 894